United States Patent
McMillan

[11] Patent Number: 5,867,915
[45] Date of Patent: Feb. 9, 1999

[54] DAY AND NIGHT GUN SIGHT APPARATUS

[76] Inventor: Gale McMillan, 28638 N. 42nd St., Cave Creek, Ariz. 85331

[21] Appl. No.: 610,377

[22] Filed: Mar. 4, 1996

[51] Int. Cl.$^6$ .................................. F41G 1/32; F41G 1/38
[52] U.S. Cl. .............................. 33/245; 33/261; 359/353; 42/101
[58] Field of Search .............................. 33/245, 247, 248, 33/253, 261, 233; 35/353, 399, 428; 356/247; 42/100, 101, 102

[56] References Cited

U.S. PATENT DOCUMENTS

| | | | |
|---|---|---|---|
| 2,946,255 | 7/1960 | Bolay | 359/353 |
| 3,529,882 | 9/1970 | Schmidt | 359/353 |
| 3,549,231 | 12/1970 | Scidmore et al. | |
| 3,712,702 | 1/1973 | Schmidt | |
| 3,974,585 | 8/1976 | Dunham | |
| 4,291,479 | 9/1981 | Lough | |
| 4,764,011 | 8/1988 | Goldstein | |
| 4,822,994 | 4/1989 | Johnson et al. | 33/245 |
| 4,961,278 | 10/1990 | Johnson et al. | 33/245 |
| 5,020,892 | 6/1991 | Glover et al. | 359/399 |
| 5,134,798 | 8/1992 | Lee | |
| 5,140,151 | 8/1992 | Weiner et al. | |
| 5,272,514 | 12/1993 | Dor | |
| 5,307,204 | 4/1994 | Dor | |
| 5,365,670 | 11/1994 | Klimochko | 33/233 |

Primary Examiner—Christopher W. Fulton
Attorney, Agent, or Firm—H. Gordon Shields

[57] ABSTRACT

Gun sight apparatus for day and night viewing includes three units, a base unit including an objective lens assembly and a windage and elevation assembly. An erector lens assembly is disposed within the windage and elevation assembly. An aiming reticle is located between the objective lens and the erector lens at the first focal plane. A second focal plane is located behind the base unit. For daytime viewing operations, a daytime unit, including an ocular lens assembly, is secured to the base unit. For nighttime viewing operations, a night vision unit, including an image intensifier tube, is secured to the base unit. The face of the image intensifier tube is located at the second focal plane when the night vision unit is secured to the base unit.

18 Claims, 1 Drawing Sheet

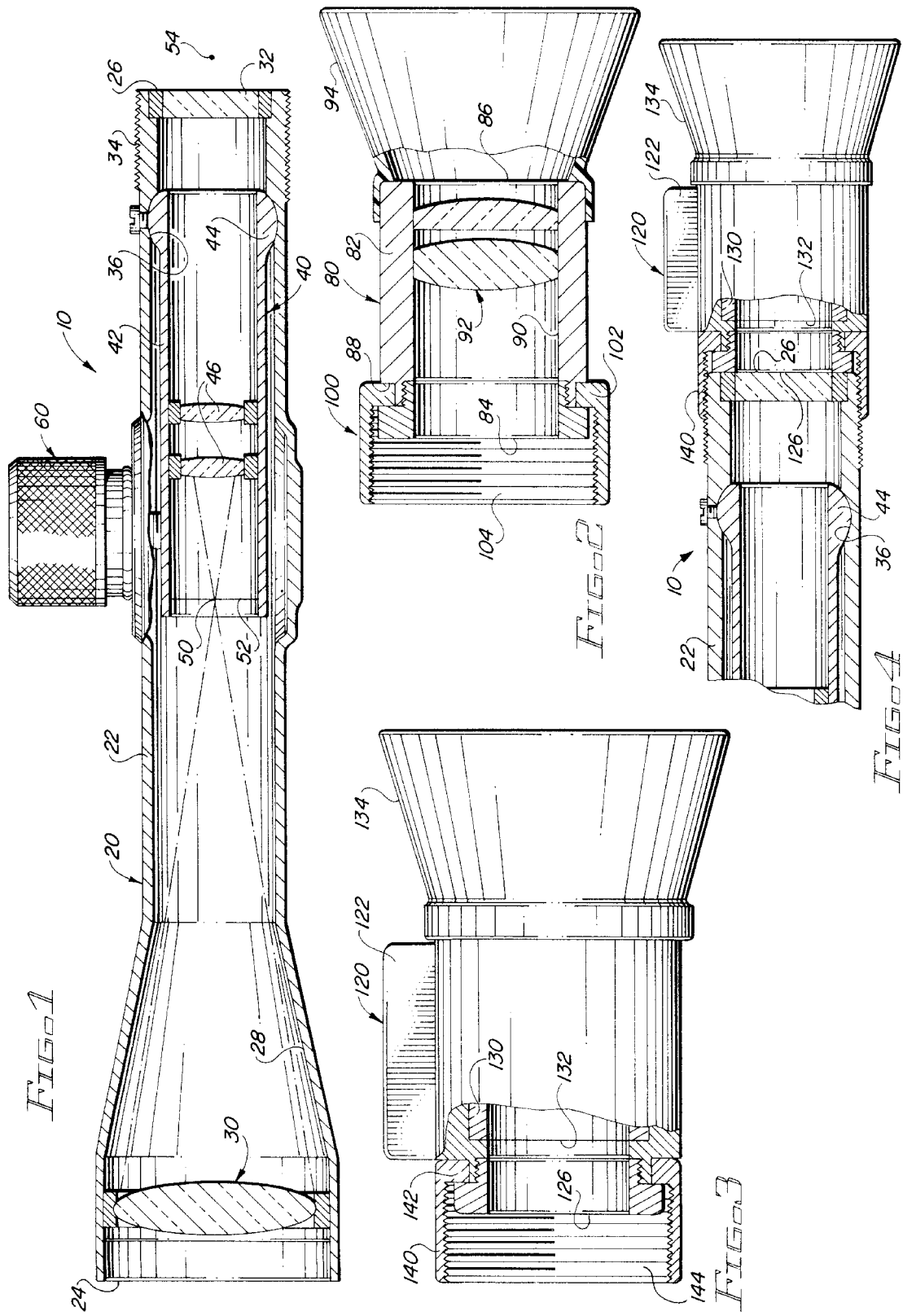

5,867,915

DAY AND NIGHT GUN SIGHT APPARATUS

BACKGROUND OF THE INVENTION

1. Field of the Invention

This invention relates to gun sights and, more particularly, to telescopic gun sight apparatus usable for daytime operations and for nighttime operations.

2. Description of the Prior Art

U.S. Pat. No. 3,529,882 (Schmidt) discloses a combined day and night viewing telescope using two different optical systems for the respective viewings.

U.S. Pat. No. 3,549,231 (Scidmore et al) discloses lens systems for a day and night periscopic sight.

U.S. Pat. No. 3,712,702 (Schmidt) discloses a lens system for day and night operations. One lens system is used for day operations and a second lens system is used for night operations, with both lens systems being included in a single element.

U.S. Pat. No. 3,974,585 (Dunham) discloses gun sight apparatus for use at night. The apparatus appears to be more concerned with the structural elements than with the optical elements.

U.S. Pat. No. 4,291,479 (Lough) discloses a day and night sight mounting apparatus for a weapon. The structural elements involved are disclosed, rather than optical elements.

U.S. Pat. No. 4,764,011 (Goldstein) discloses a sighting apparatus for day and night use in which a beam splitting optical system is used.

U.S. Pat. No. 4,822,994 (Johnson et al) discloses day and night telescopic sight apparatus in which an image intensifier module for night operation is inserted between front and rear sections of a telescopic sight. The image intensifier module is removable for daytime use.

U.S. Pat. No. 4,961,278 (Johnson et al) discloses two sections of a telescopic sight, front and rear optical sections, with an image intensifier unit pivotally secured between the two optical lens units. The image intensifier unit is pivoted out of alignment for daytime operation and is pivoted into alignment for nighttime operation.

U.S. Pat. No. 5,134,798 (Lee) discloses a mounting system for two sights, one sight for day use and one sight for night use. No optics are disclosed. The mounting system structure allows two different systems to be mounted on the disclosed structure.

U.S. Pat. No. 5,5,140,151 (Weiner et al) discloses an optical system for day and night usage.

U.S. Pat. No. 5,272,514 (Dor) discloses a modular day and night gun sight apparatus. The apparatus discloses a different aiming system for day and night using a light source to assist in the aiming process.

U.S. Pat. No. 5,307,204 (Dor) discloses a mounting system for mounting a night vision system to a helmet.

In some of the above described patents, only optical systems are disclosed. In others of the above described patents, structural elements are involved. However, it will be noted that none of the above described patents disclose a relatively simple telescopic sight in which two elements, one element for day sighting and one element for night sighting, may be quickly and easily secured to a single element which may be referred to as a base telescopic sight element or housing. The apparatus of the present invention comprises three separate elements, a base telescopic sight element and two modules which may be selectively secured to the base telescopic sight module, one module for daytime sighting and the second module for nighttime sighting.

SUMMARY OF THE INVENTION

The invention described and claimed herein comprises a basic telescopic sight module which includes an objective lens system and a windage and elevation unit, with an aiming reticle located at the focal plane of the objective lens, and a separate day viewing ocular unit and a separate image intensifier unit for nighttime sighting. The base unit includes a front end at which the objective lens is located, and a rear end sealed with a transparent element, such as glass, and fastening elements at the second or rear end for connecting either the objective lens unit for daytime operation or the image intensifier unit for nighttime operation. Within the base unit is a windage and elevation unit, which, of course, is well known and understood in the art. The focal plane from the erector lens in the windage and elevation unit is located at a predetermined distance behind the transparent end of the base unit. When the image intensifier unit for night operations is secured to the front or base unit, the front face of the image intensifier tube is located at the second focal plane.

Among the objects of the present invention are the following:

To provide new and useful telescopic sight apparatus;

To provide new and useful telescopic sight apparatus of modular construction;

To provide new and useful telescopic sight apparatus having three elements, a first or base unit which includes an objective lens and a windage and elevation unit having therein erector lens, a second unit for daytime viewing securable to the first unit, and a third unit for nighttime viewing securable to the first unit; and To provide new and useful telescopic sight apparatus having a reticle disposed at a first focal plane within a base unit, a second focal plane, and a second unit securable to the first unit for nighttime observation and having an image intensifier tube therein and the second focal plane is located at a predetermined distance behind the first unit and at the face of the image intensifier unit.

BRIEF DESCRIPTION OF THE DRAWING

FIG. 1 comprises a view in partial section of a portion of the apparatus of the present invention.

FIG. 2 is a view in partial section of a second portion of the apparatus of the present invention.

FIG. 3 is a view in partial section of a third portion of the apparatus of the present invention.

FIG. 4 is a fragmentary view in partial section of an assembled embodiment of the present invention.

DESCRIPTION OF THE PREFERRED EMBODIMENT

FIG. 1 is a view in partial section of a base unit 20 of telescopic sight apparatus 10 of the present invention. The first unit or base unit 20 includes a housing 22 which is generally of a cylindrical configuration, having a first or front end 24 and a sealed second or rear end 26. Within the housing 22 are a series of bores 28. The bores 28 vary in diameter to accommodate various portions of the apparatus. The bores include a tapered portion, a relatively square portion, etc., as is well known and understood in the art.

Adjacent to the front end 24 there is an objective lens assembly 30. The objective lens assembly 30 is appropriately secured to and sealed within the largest diameter portion of the bores 28. Rearwardly of the objective lens assembly 30 is a tapered bore portion extending to a minimum diameter portion, which minimum diameter portion comprises the longest bore section of the housing 22.

At the rear end 26, there is a transparent element 32 appropriately sealed to the housing 22. The rear face of the transparent element 32 is aligned with, or defines with the rear end of the housing 22, the rear end 26.

On the exterior of the housing 22 at the rear end 26 are external threads 34. The external threads 34 matingly engage both the second and third units to define telescopic sight apparatus for either daytime or nighttime viewing.

On the inside of the housing 22, inwardly or forwardly from the rear end 26, there is a circumferentially extending groove 36. The groove 36 engages or receives a rear portion of a windage and elevation assembly 40. The windage and elevation assembly 40 includes a tube 42 which extends forwardly with respect to the housing 22 from a circumferentially extending ridge 44. The ridge 44 extends into and is received, and appropriately secured, within the groove 36. The windage and elevation tube 42 pivots on the ridge 44 within the groove 36 to compensate for windage and elevation by adjustment units, discussed below, as is well known and understood in the art.

Within the tube 42, remote from the ridge 44, is an erector lens assembly 46. The erector lens assembly 46 is also well known and understood in the art.

Between the objective lens assembly 30 and the erector lens assembly 46 is a first focal plane 50. A reticle 52 is disposed at the first focal plane 50.

A windage and elevation adjustment assembly 60, comprising two units spaced ninety degrees apart, one unit of which is shown in FIG. 1, moves the tube 40 to adjust the reticle 52 for windage and elevation, as desired. The windage and elevation assembly 60 is disposed at a generally square bore portion and is also well known and understood in the art.

Rearwardly of the erector lens assembly 46, and a variable power lens assembly, not shown, but well known and understood in the art, is a second focal plane 54. The second focal plane 54 is located at a predetermined distance rearwardly of the housing 22, and accordingly behind the transparent rear element 32, or behind the rear face of the transparent element 32. The predetermined distance, such as fifteen millimeters, will be further discussed below. The purpose of having the second focal plane located behind the housing 22 will be explained below.

FIG. 2 comprises a view in partial section of a daytime ocular unit 80 securable to the housing 22 to comprise a daytime telescopic sight apparatus 10 for daytime viewing. The daytime ocular unit includes a generally cylindrical housing 82 having a front end 84 and a rear end 86. Adjacent to the front end 84 is a circumferentially extending tube 88. Within the housing 82 is a bore 90. An ocular lens assembly 92 is disposed in the bore 90.

A connector ring 100 extends forwardly from the housing 82. The ring 100 includes a radially inwardly extending flange 102 which extends into the groove 88. Within the ring 100 are interior threads 104. The threads 104 matingly engage the threads 34 of the housing 22 to secure the daytime ocular unit 80 to the first unit 20.

When the front end 84 of the daytime ocular lens unit 80 is secured to the housing 22, the front end 84 is disposed against the rear end 26 of the housing 22, and the ocular lens assembly 92 is located at an appropriate distance with respect to the second focal plane 54. (See FIG. 1).

FIG. 3 comprises a view in partial section of the third unit of the present invention, comprising a nighttime viewing unit 120. The nighttime viewing unit 120 includes a housing 122 in which is disposed the elements necessary for nighttime viewing, which elements are again well known and understood in the art.

The housing 122 includes a front cylindrical portion 124 having a front end 126. Disposed about the front cylindrical portion 124 is a circumferentially extending groove 128. Within the housing unit 122 is an image intensifier tube 130, and the image intensifier tube 130 includes a front face 132.

A connector ring 140 is appropriately secured to the front cylindrical portion 124. The connector ring 140 is substantially identical to the connector ring 100, discussed above. The ring 140 includes a radially inwardly extending flange 142 which extends into the groove 128. Within the connector ring 140 are internal threads 144. The threads 144 matingly engage the threads 34 of the housing 22 to connect the nighttime viewing unit 120 to the base unit 20 for nighttime viewing.

When the nighttime viewing unit 120 is secured to the base unit 20, the front end 126 of the housing 122 is disposed against the rear end 26 of the housing 22, and at that time the front face 132 of the image intensifier tube 130 is disposed at the second focal plane 54.

It will readily be seen that the three units comprise a telescopic sight apparatus simple and convenient for use in both daytime viewing operations and nighttime viewing operations. The base unit 20 may be appropriately secured to a weapon, and the two units 80 and 120 may be connected to the base unit 20 as appropriate.

FIG. 4 comprises a fragmentary view of the rear portion of the base unit 20 with the nighttime viewing unit 120 secured thereto. The connector ring 140 is secured to the housing 22 by the mating engagement of the internal threads 144 to the external threads 34, thus disposing the front end 126 of the night unit housing 122 against the rear end 26 of the base unit housing 22.

When the rear end 26 and the front end 126 of the respective units are in such mating disposition or orientation, the front face 132 of the image intensifier tube 130 is disposed at the second focal plane 54 (see FIG. 1).

Note that external threads are shown at the rear portion of the housing 22, and internal threads and connector rings are shown on the units 80 and 120 for connection to the base unit 20. It is obvious that the connecting elements or structures may be reversed. That is, a connector ring may be disposed on the base unit 20, and external threads may be disposed on the respective units 80 and 120, for appropriate connection, if desired.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Telescopic sight apparatus for daytime and nighttime viewing comprising in combination:

a first unit having a first end and a second end remote from the first end, an objective lens adjacent to the first end providing a first focal plane within the first unit;

an aiming reticle disposed at the first focal plane;

erector lens means disposed within the first unit providing a second, focal plane rearwardly of the second end;

a second unit for daytime viewing securable to the second end of the first unit, including ocular lens means for providing a visual image of a target for a user during daytime viewing; and a third unit for nighttime viewing securable to the second end of the first unit, including an image intensifier tube having a face disposed at the second focal plane for providing an image of a target for a user for nighttime viewing.

2. The apparatus of claim 1 in which the first unit includes a tubular housing and the objective lens is secured to the tubular housing adjacent to the first end.

3. The apparatus of claim 2 in which the first unit further includes windage and elevation means disposed within and secured to the tubular housing adjacent to the second end.

4. The apparatus of claim 3 in which the windage and elevation means includes a windage and elevation tube pivotally secured to the tubular housing to adjust the reticle for windage and elevation.

5. The apparatus of claim 4 in which the erector lens means and the reticle are disposed within the windage and elevation tube.

6. The apparatus of claim 1 in which the first unit includes exterior threads adjacent to the second end for securing the second unit and the third unit to the first unit for respective daytime and nighttime viewing.

7. The apparatus of claim 6 in which the second and third units include interior threads for coupling to the exterior threads of the first unit.

8. The apparatus of claim 1 in which second end of the first unit includes a transparent element sealed to the first unit, and the transparent element has a rear face.

9. The apparatus of claim 8 in which the second focal plane is located at a predetermined distance rearwardly of the rear face of the transparent element.

10. Sight apparatus for day and night operation comprising in combination:

a first unit having a first end and a second end;

objective lens means disposed within the first unit for providing a first focal plane;

erector lens means disposed within the first unit spaced apart from the objective lens means for providing a second focal plane rearwardly of the second end of the first unit;

a second unit securable to the second end of the first unit;

ocular lens means disposed within the second unit for providing a visual image for day operation; and a third unit securable to the second end of the first unit for night operation, including an image intensifier tube having a face disposed at the second focal plane when the second unit is secured to the first unit.

11. The apparatus of claim 10 which further includes a reticle disposed at the first focal plane.

12. The apparatus of claim 11 which further includes windage and elevation means for adjusting the reticle.

13. The apparatus of claim 12 in which the windage and elevation means includes a tube disposed within the first unit and pivotally secured to the first unit adjacent to the second end.

14. The apparatus of claim 13 in which the erector lens means and the reticle are disposed within the tube of the windage and elevation means.

15. The apparatus of claim 14 in which the windage and elevation means further includes means for pivotally adjusting the tube to adjust the reticle.

16. A method of telescopingly viewing objects during the day and the night, comprising the steps of:

providing a first unit having a first end and a second end;

providing an objective lens having a first focal plane in the first unit;

providing an erector lens in the first unit spaced apart from the first focal plane and having a second focal plane rearwardly of the second end of the first unit;

providing a second unit securable to the second end of the first unit;

providing an ocular lens in the second unit;

securing the second unit to the first unit for day viewing;

providing a third unit securable to the second end of the first unit;

providing an image intensifier tube having a front face in the third unit;

securing the third unit to the second end of the first unit for night viewing;

positioning the front face of the image intensifier tube at the second focal plane.

17. The method of claim 16 which further includes providing a reticle at the first focal plane.

18. The method of claim 17 which further includes providing windage and elevation adjustment for the reticle.

* * * * *